June 4, 1929.  A. G. BARROW  1,716,203
ELECTRICALLY HEATED MACHINE FOR THE BREWING
OF TEA, COFFEE, AND LIKE BEVERAGES
Filed June 7, 1928
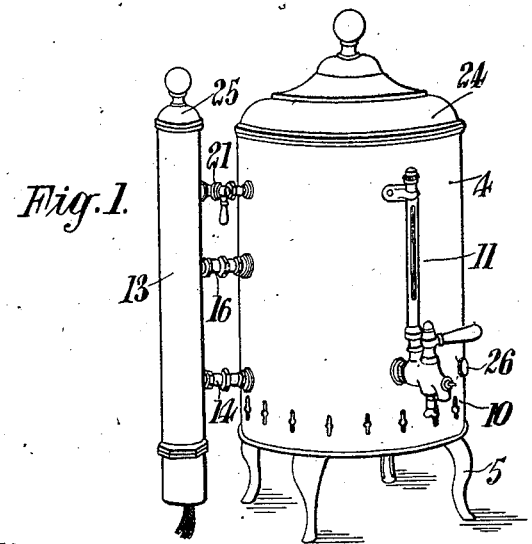
Fig. 1.
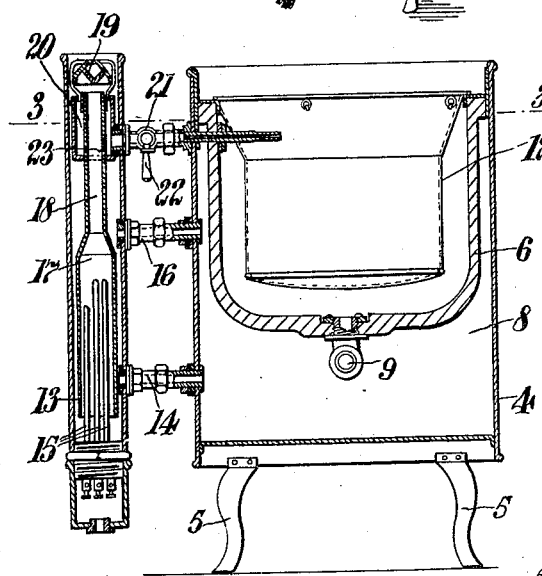
Fig. 2.
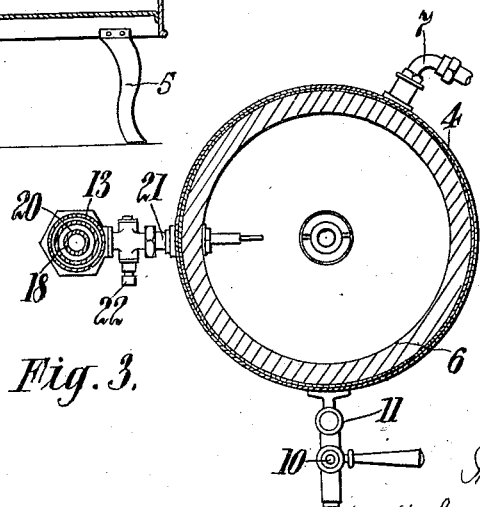
Fig. 3.

Patented June 4, 1929.

1,716,203

UNITED STATES PATENT OFFICE.

ADAM GOTHARD BARROW, OF ROUNDHAY, ENGLAND, ASSIGNOR TO JACKSON BOILERS LIMITED, OF LEEDS, ENGLAND, A BRITISH COMPANY.

ELECTRICALLY-HEATED MACHINE FOR THE BREWING OF TEA, COFFEE, AND LIKE BEVERAGES.

Application filed June 7, 1928, Serial No. 283,694, and in Great Britain August 27, 1927.

This invention relates to self-contained electrically-heated machines for the brewing of tea, coffee and the like beverages, of the type in which a storage urn or urns are combined with an electrically-heated water-boiling attachment.

According to the invention the urn comprises an inner vessel for storing the beverage surrounded by a water jacket, the water level in which is maintained by a ball tap and the water from which by means of suitable connections or water-ways circulates through an external chamber in which is located an electric immersion heater of any suitable pattern which projects into a boiling compartment located within the chamber, having at its upper end an expansion pipe connected at the upper end to a collecting chamber for boiling water, connected by means of a suitable pipe having a controlling cock therein with the inner vessel in which the coffee or the like is brewed.

In this manner the immersion heater can heat the water in the separate chamber to cause the water in the jacket to be heated, and in addition the immersion heater can also boil the water which comes into the inner boiling compartment in such a manner that the boiling water passes up the expansion pipe to the annular chamber, and then by opening the cock or tap means in the connection to the inner chamber of the urn, the boiling water can be supplied thereto for the purpose of brewing the coffee or the like. Upon shutting the said cock or tap the immersion heater continues to maintain in a heated condition the water in the outer jacket of the urn to keep the brewed beverage hot.

In some cases more than one urn may be combined with a single electrically-heated boiling chamber.

In order that the invention may be better understood, it will now be described with reference to the accompanying drawings in which:—

Fig. 1 shows a perspective elevation of one form of electrically-heated machine for brewing tea, coffee or the like beverages.

Fig. 2 shows a sectional elevation thereof, certain parts being removed, and

Fig. 3 shows a section on the line 3—3, Fig. 2.

The urn comprises an outer vessel 4 of metal or other suitable material standing upon suitable feet or the like 5, and an inner vessel 6 of earthenware or other suitable material. The space between the inner and outer vessels is supplied with water from an inlet 7 in connection with a ball cock valve, so disposed that the level of the water in the chamber 8 between the vessels 4 and 6 is kept constant. 9 is an outlet from the inner chamber or vessel 6 which outlet communicates with a draw-off tap 10 controlled by a suitable handle. 11 is a gauge to indicate the level of the beverage in the inner chamber 6 and 12 is a bag, strainer or the like for coffee or tea, kept extended and suitably supported in the inner vessel 6 as shown. 13 is a chamber connected by a pipe 14 to the chamber 8 within the vessel 4 towards the lower end. At the lower end of the chamber 13 is connected by screw means a suitable immersion heater 15 having the desired number of elements, any one or more of which may be inserted at the same time. The chamber 13 is also connected at a higher level by means of a pipe 16 with the chamber 8 of the vessel 4 and when the immersion heater 15 is in action the hot water in the chamber 13 is caused to circulate through the pipes 14 and 16 to and from the chamber 8. In this condition the immersion heater preferably only has one element being heated by what may be termed a bye-pass current. In the chamber 13 is located a boiling compartment 17, as shown, into which the elements 15 project. The upper end of the boiling compartment 17 has connected thereto an expansion pipe 18, the upper end of which opens beneath a deflector 19, which causes boiling water issuing therefrom to pass to an annular collecting box or chamber 20. This box or chamber is connected by a pipe 21 to the inner vessel 6, a tap or valve 22 being located in this pipe 21. When it is desired to deliver boiling water to the inner vessels 6, it is simply necessary to heat the water by means of the elements 15 of the immersion heater until boiling water passes up the expansion pipe 18 and overflows from the top thereof into the annular chamber 20, and then by opening the tap 22 the boiling water passes from the annular chamber 20 through the pipe 21 to the inner vessel 6. By disposing a desired quantity of coffee or the like in the bag 12, when the boiling water is delivered to the inner vessel 6, the coffee or the like is brewed. The continual heating of the water and the circulation thereof through the pipes 14 and 16, to and from the chamber 8 maintains the brewed coffee or the like in a hot condition, and it can be drawn off according to requirements by opening the tap 10.

When the desired quantity of boiling water has passed from the boiling attachment to the inner vessel 6, the tap 22 can be closed. Any boiling water remaining in the chamber 20 passes back to the expansion pipe 18 by means of a small weeping hole 23 in the said annular chamber opening into the expansion pipe. 24 is a cap or cover to the urn and 25 is a cap to the chamber 13, both of which caps may be furnished with vents or the like permitting the escape of steam if so desired. 26 is an emptying plug located in the wall of the outer vessel 4 by which the contents thereof may be draw off if desired.

Should the full power of the immersion heater be left on when the tap 22 is in the closed position, boiling water from the chamber 20 overflows to the chamber 13, thus further heating the water therein.

The invention is not limited to the precise forms or details of construction described as these may be varied to suit particular cases.

What I claim and desire to secure by Letters Patent of the United States of America is:—

1. An electrically heated apparatus for the brewing of beverages, comprising an urn, an inner vessel therein for storing the beverage, a water jacket surrounding the inner vessel, an external chamber for water, a plurality of conduits connecting the water jacket with the external chamber, means for electrically heating the water in the external chamber, a connection from the external chamber to the inner vessel, and a draw-off tap for the brewed beverage from the inner vessel, a construction including a boiling compartment located in the external chamber, an expansion pipe opening from the upper portion of the boiling compartment and having an open upper end, a collecting chamber for collecting boiling water passing through the open upper end of the expansion pipe, a pipe from the collecting chamber to the inner vessel of the urn, and a tap in the said pipe.

2. An electrically-heated machine for the brewing of tea, coffee and the like beverages as claimed in claim 1 in which the boiling water collecting chamber is comprised by an annular chamber surrounding the upper end of the expansion pipe.

3. An electrically-heated machine for the brewing of tea, coffee and the like beverages as claimed in claim 1 in which the boiling water collecting chamber has a weeping hole at the lower end thereof.

In witness whereof I affix my signature.

ADAM GOTHARD BARROW.